Figure 2:
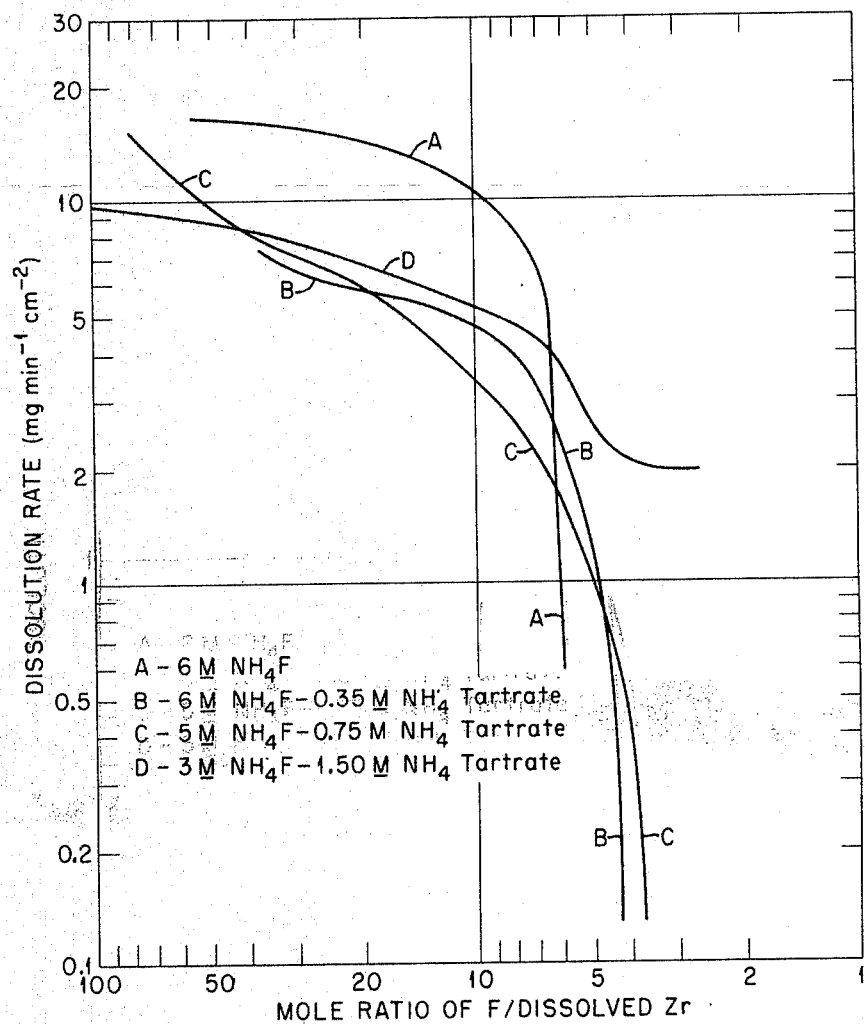

INVENTOR.
Theodore A. Gens

United States Patent Office 3,298,957
Patented Jan. 17, 1967

3,298,957
METHOD FOR DISSOLVING ZIRCONIUM AND FORMING STABILIZED ALKALINE SOLUTIONS THEREOF
Theodore A. Gens, Oak Ridge, Tenn., assignor to the United States of America, as represented by the United States Atomic Energy Commission
Filed Apr. 6, 1964, Ser. No. 357,830
5 Claims. (Cl. 252—182)

The present invention relates to an improved method for dissolving zirconium in aqueous ammonium fluoride solutions and to the resultant stabilized alkaline solutions produced thereafter. The method has particular utility as an improvement in the so-called Zirflex process which is designed to accomplish selective dissolution of zirconium or zirconium alloy cladding for reactor fuels by dissolution of the cladding material in aqueous solutions of ammonium fluoride, alone or in admixture with ammonium nitrate. A description of the Zirflex process is given in an article by J. L. Swanson on pages 154–161 (vol. 17) of the Second United Nations International Conference on the peaceful Uses of Atomic Energy.

The processing of irradiated or spent fuel elements to recover the unburned fuel or special nuclear material produced by the irradiation results in the production of highly radioactive salt solutions. Because of health and safety considerations, these salt solutions must be stored in metal tanks for a period of time, at least until the radioactivity has decayed to a relatively safe level. The salt solutions resulting from the dissolution of zirconium or zirconium alloys by the use of an aqueous ammonium fluoride solution results in the production of neutral or slightly acidic (i.e., a pH in the range 6–7) wastes which are exceedingly corrosive with respect to the container materials. The standard tank material of construction is generally made of mild steel or stainless steel. Corrosion rates are accelerated by the heat generated as a result of the decay of radionuclides in the solution. A further increase in the rate of corrosion is brought about by the precipitation of metal values. The precipitation of metal values is a problem because fission products are entrained in the precipitate causing localized heating and hence increased rate of localized corrosion. Solutions which have a tendency to be precipitated are, to that extent, called unstable. It would be desirable, and it is an object of this invention, to stabilize such solution against adverse precipitate-inducing conditions.

It is known that alkaline solutions are generally less corrosive toward waste storage vessels in comparison to solutions which are neutral or acidic. However, zirconium hydroxide precipitates from Zirflex solutions as the pH is increased from a neutral condition. The precipitation of zirconium hydroxide is a problem because fission products are generally retained in the precipitate causing, as previously mentioned, localized heating and hence increased corrosion rates. It is, therefore, another object of this invention to form stabilized alkaline solutions of zirconium in an aqueous ammonium fluoride solvent. A further object of this invention, in combination with the aforementioned objects, is to provide an improved method of dissolving zirconium wherein the resultant zirconium-containing solution is amenable to be formed into a stable alkaline solution.

The objects relating to the formation of a stable alkaline solution of zirconium are realized by adding a zirconium complexing agent soluble in an aqueous solution of ammonium fluoride and selected from the group consisting of α-hydroxy-carboxylic acid including citric, tartaric, glycolic and lactic and aqueous soluble salts of these acids, preferably with weak bases such as $NH_4OH$ rather than with a strong base such as NaOH, at an appropriate complexing agent to zirconium molar ratio, to a solution of zirconium in ammonium fluoride and thereafter adjusting the resulting solution to a pH in the range 8–9. Under these conditions, the resultant solution remains stable (i.e., no noticeable precipitation is noted) at the reflux temperature at least over a one year period at 25° C.

The parameters which determine the stability of the desired alkaline zirconium-containing solution are the amount of zirconium in solution expressed in terms of the selected complexing agent to zirconium mole ratio and the pH of the final solution. In the ensuing description and recitation of examples of the invention, reference will be made to the use of ammonium tartrate as the selected zirconium complexing agent. However, it should be understood that the principles of the invention as recited in connection with the use of ammonium tartrate to realize the objects of this invention will be equally applicable to the use of the other selected zirconium complexing agents, and while the concentration limits of other selected complexing agents may be different and vary from those recited in connection with ammonium tartrate, such limits can be easily and routinely determined, and the advantages accruing from the use of ammonium tartrates will also be realized with the other complexing agents in the selected class.

Figure 1:
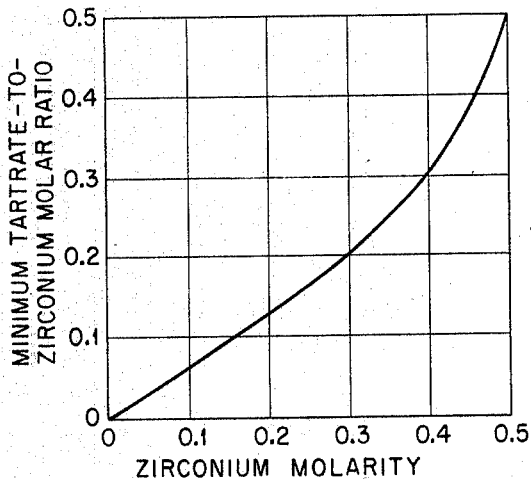

One mode of carrying out the invention to form a stable solution, is to add the selected complexing agent to a solution of zirconium dissolved in an aqueous ammonium fluoride solvent. In connection with the use of ammonium tartrate as the complexing agent for a zirconium-solution containing 8 moles of fluoride per mole of zirconium, I have found that a molar ratio of tartrate to zirconium of 0.1 is sufficient to stabilize a 0.15 M zirconium solution, while a ratio of 0.5 is needed to stabilize a 0.5 M zirconium solution. The relation between zirconium concentration in the ammonium fluoride solution to be treated and the amount of tartrate needed to ensure effective stabilization of the alkaline solution to be formed thereafter is shown in the curve of the graph of FIG. 1 for a solution containing 8 moles of fluoride per mole of zirconia, which is a plot of the tartrate/zirconium molar ratio (on the ordinate) against the zirconium concentration in solution (on the abscissa).

After the necessary amount of tartrate has been added to the solution, the desired stability is effected by adjusting the tartrate solution to a pH in the range 8–9. Solutions of higher alkalinity result in a reduction or loss of the desired stability.

It should be noted at this point that the practice of the invention, as previously recited, assumes the prior existence of a solution of zirconium produced by the dissolution of the zirconium in an aqueous solution of ammonium fluoride in general accordance with the previously known Zirflex process. To effect complete dissolution in accordance with the Zirflex process, an excess amount of fluoride ions is required. Unfortunately, the excess fluoride limits the solubility of zirconium in ammonium fluoride solutions, for it has been determined that the solubility of zirconium increases as the amount of fluoride concentration decreases. Thus, under the conditions of the Zirflex process, the maximum practical zirconium solubility which can be achieved is limited to a maximum of about one molar in zirconium. With this point in mind, I propose a preferred embodiment of my invention which involves a modification of the Zirflex process in which the dissolvent consists of an aqueous solution containing a mixture of ammonium fluoride and the selected zirconium complexing agent. I have found that if the complexing agent is added to the ammonium fluoride, an improved resulting zirconium dissolution medium is provided which allows the use of a lower fluoride/zirconium molar ratio to effect efficient dissolution of zirconium, and, at the same time, permits the subsequent formation of a stable alkaline solution of zirconium. For example, in the case where a tartrate is combined with the ammonium fluoride dissolvent solution, a lower fluoride/zirconium ratio can be used in dissolving a given quantity of zirconium in comparison to the ratio needed when ammonium fluoride alone is used. Thus, a tartrate-ammonium fluoride dissolvent solution can result in the formation of a zirconium solution up to 2 molar in zirconium at practical dissolution rates, provided that the tartrate/zirconium molar ratio is maintained within certain prescribed limits.

When an aqueous solution of ammonium fluoride alone is used to dissolve the zirconium metal or zirconium alloy, a marked decrease in the rate of dissolution is reached as the fluoride/zirconium mole ratio approaches 6. This is attributed to the formation of a highly stable zirconium fluoride complex which reduces the concentration of fluoride ions, the effective zirconium dissolving species, available for further interaction. However, in accordance with a preferred embodiment of this invention, when the dissolution agent comprises an aqueous solution of ammonium fluoride combined with a stipulated amount of the selected complexing agent dependent on the tartrate/zirconium molar ratio to be hereinafter described, less fluoride is needed to dissolve a given amount of zirconium in comparison to an ammonium fluoride solution alone, and hence a lower molar ratio of fluoride-zirconium can be used in dissolving a given quantity of zirconium to produce solutions more concentrated in zirconium than is possible with ammonium fluoride solutions in the absence of the selected complexing agent. The resultant advantage, among others, is that stabilized alkaline fluoride solutions of zirconium are obtained which are more concentrated in zirconium than have heretofore been previously thought possible. The advantage of effecting zirconium dissolution with a dissolvent consisting of an aqueous solution of ammonium fluoride combined with a selected zirconium complexing agent is clearly shown by the curves plotted in the graph of FIG. 2, in which tartaric acid is used as the exemplary embodiment. In FIG. 2, the dissolution rate of zirconium is plotted against the fluoride/zirconium ratio in solution as determined during the course of dissolving a Zircalloy-specimen represented by curves A–D of FIG. 2. For purposes of comparison, the dissolution behavior of a 6 molar ammonium fluoride solution is shown in curve A. It is seen that as the fluoride/zirconium molar ratio approaches 6, the dissolution rate drops sharply. The effect of adding tartrate to the ammonium fluoride dissolvent is shown in the curves B–D. In curve B, the initial dissolution rate of the Zircalloy specimen in a 6 molar ammonium fluoride-0.35 molar ammonium tartrate solution was about equal to the rate in 6 molar ammonium fluoride alone. The difference in the two solutions becomes apparent as the fluoride/zirconium ratio in the solution reaches 6. In the pure 6 mole ammonium fluoride solution, the reacton stops. However, in the solution containing tartrate, a dissolution rate was still measurable at a fluoride/zirconium ratio of about 4, indicating that the tartrate-containing solution has a greater capacity for zirconium. In curve C, where the dissolvent was 5 molar ammonium fluoride-0.75 molar ammonium tartrate, an effective dissolution rate was still measured at a fluoride/zirconium mole ratio of less than 4. In curve D, where the dissolvent consisted of a mixture of 3 molar ammonium fluoride and 1.5 molar ammonium tartrate, the dissolution rate increased by at least an order of magnitude to in excess of 2 milligrams/centimeter$^2$-minute at a fluoride to zirconium mole ratio of less than 3. I have found that addition of tartrate, preferably as ammonium tartrate, up to an upper limit of 2 molar can be substituted for fluoride in the dissolvent in order to obtain an effective dissolution rate at a fluoride/zirconium molar ratio lower than 6 while increasing the solubility of zirconium. The lower limit of ammonium fluoride needed to obtain a practical dissolution rate in combination with the tartrate additive is about 2 molar.

The striking increase in zirconium solubility provided by the tartrate additive was demonstrated in one case where a solution 1 molar in zirconium obtained in a dissolvent 3 molar in ammonium fluoride and 1.5 molar in ammonium tartrate was evaporated to a solution 2 molar in zirconium. This, it should be noted, is equivalent to a 6 molar ammonium fluoride solution which when obtained by effecting dissolution in accordance with the Zirflex process had a maximum zirconium capacity no greater than about 1 molar in zirconium. All of the aforementioned tartrate-containing ammonium fluoride solutions can be converted to stable alkaline solutions by suitable adjustment to a pH in the range 8–9.

In connection with the applicability of this invention in selectively dissolving spent zirconium or zirconium alloy clad elements, it should be noted that, under reactor conditions, a passive oxide film is sometimes produced on the surface of the metal. Such a film is not easily dissolved by the ammonium fluoride-zirconium complex dissolvent mixtures, but is more effectively penetrated by ammonium fluoride solutions of the Zirflex type. In such cases, where penetration of an oxide film is needed, the initial dissolvent should preferably consist of ammonium fluoride solution alone without the zirconium complexing agent additive. However, as soon as the oxide film is penetrated, the tartrate or other zirconium complexing agent may be added to obtain the benefits of increased zirconium solubility while achieving effective dissolution rates at the lower fluoride concentrations permitted by this invention.

It will be seen that there has been described a process for forming stable alkaline solutions of zirconium in an ammonium fluoride solution in order to alleviate corrosivity effects during long term storage in vessels constructed of such materials as mild steel and stainless steel. Where stability is the sole object, the production of a stable alkaline solution is effected by the addition of the selected complexing agent in the proportions previously circumscribed, by the addition of the complexing agent to the zirconium-containing ammonium fluoride solution followed by adjustment of the resultant solution to a pH in the range 8–9. In its preferred embodiment, the selected zirconium complexing agent is combined with the initial ammonium fluoride solution to provide a dissolvent solution which permits enhanced zirconium solubility at fluoride/zirconium molar ratios lower than heretofore previously thought possible. In this case, the stable alkaline solution is obtained as before, by adjusting the tartrate/zirconium ratio in the solution in accordance with the relation described by the curve of FIG. 1, followed by the final step of pH adjustment within the range 8–9.

While the invention has been described with respect to the use of a soluble tartrate complexing agent, it is, of course, as previously mentioned, by no means limited to, nor are the resultant advantages realized only by this reagent. The adavntages demonstrated with respect to tartrate will be equally realized by using the other zirconium complexing agents in the same manner. However, the concentrations of the other complexing agents needed to effect the herein-described advantages will vary according to the complexing agent selected. Such limits can be readily determined by the application of the principles of the invention hereinbefore set out in connection with the use of tartrate.

Having thus described my invention, I claim:

1. A method for forming a stable alkaline solution of zirconium which comprises dissolving zirconium in an aqueous solution of ammonium fluoride and a zirconium complexing agent selected from the group consisting of tartaric acid, glycolic acid, lactic acid and salts of said acid which are soluble in aqueous ammonium fluoride solutions thereof and then adjusting the resulting solution to an alkaline pH at which the resulting zirconium complex remains in solution.

2. The method according to claim 1 wherein the concentration of ammonium fluoride is in the range 2–6 molar.

3. A method for forming a stable alkaline solution of zirconium which comprises dissolving zirconium in an aqueous solution of ammonium fluoride containing a tartrate, selected from the group consisting of tartaric acid, and a tartrate salt soluble in said solution and then adjusting the resultant zirconium containing solution to a pH in the range 8–9.

4. A method for forming a stable solution of zirconium which comprises reacting an article containing zirconium with a 2–6 molar aqueous ammonium fluoride solution and a zirconium complexing agent selected from the group consisting of an alpha-hydroxy-carboxylic acid and salts which are soluble in said solution, and adjusting the pH to an alkaline range at which the resultant zirconium complex remains in solution.

5. The method according to claim 4 in which the alpha-hydroxy-carboxylic acid is selected from the group consisting of citric acid, tartaric acid, glycolic acid, lactic acid, and salts thereof, soluble in 2–6 molar aqueous ammonium fluoride solution.

References Cited by the Examiner
UNITED STATES PATENTS

| | | | |
|---|---|---|---|
| 2,977,204 | 3/1961 | Shannon | 252—79.3 X |
| 3,222,289 | 12/1965 | Clark | 252—182 |

LEON D. ROSDOL, *Primary Examiner.*

M. WEINBLATT, *Assistant Examiner.*